March 7, 1944.  F. WOLF ET AL  2,343,354

ELECTRIC MOTOR

Filed Oct. 22, 1941  6 Sheets-Sheet 1

Inventors
FREDERICK WOLF
FRANTISEK SIGMUND

By Young, Emery & Thompson
attys.

March 7, 1944.  F. WOLF ET AL  2,343,354
ELECTRIC MOTOR
Filed Oct. 22, 1941  6 Sheets-Sheet 2

Inventors
FREDERICK WOLF
FRANTISEK SIGMUND
By Young, Emery & Thompson
attys.

March 7, 1944.  F. WOLF ET AL  2,343,354
ELECTRIC MOTOR
Filed Oct. 22, 1941  6 Sheets-Sheet 3

Inventors
FREDERICK WOLF
FRANTISEK SIGMUND
By Young, Emery & Thompson
Attys.

March 7, 1944.　　　F. WOLF ET AL　　　2,343,354
ELECTRIC MOTOR
Filed Oct. 22, 1941　　　6 Sheets-Sheet 4

Inventors
FREDERICK WOLF
FRANTSEK SIGMUND
By Young, Emery & Thompson
attys.

March 7, 1944. F. WOLF ET AL 2,343,354
ELECTRIC MOTOR
Filed Oct. 22, 1941 6 Sheets-Sheet 5
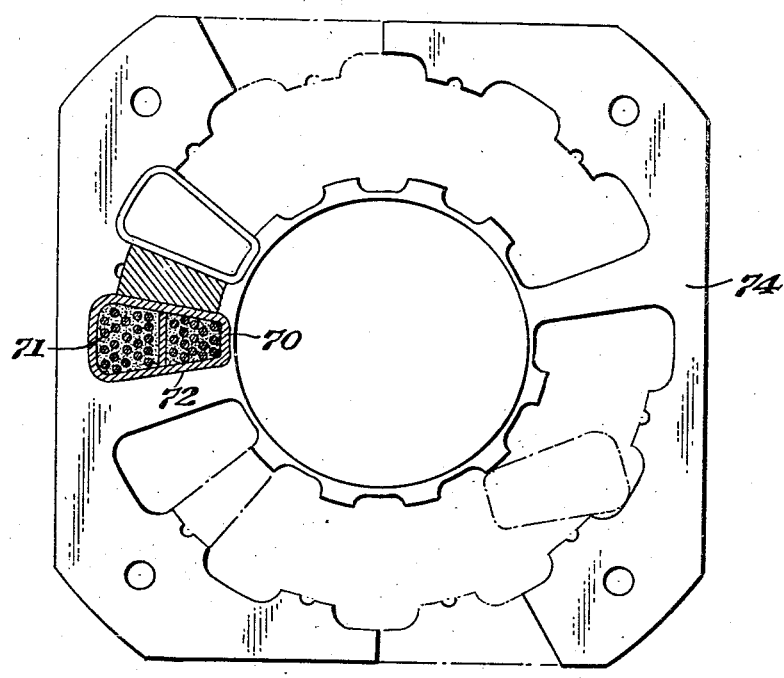
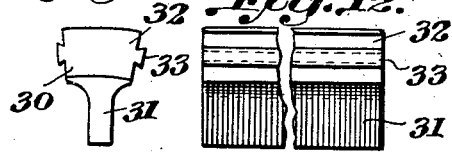
Fig. 11. Fig. 12.
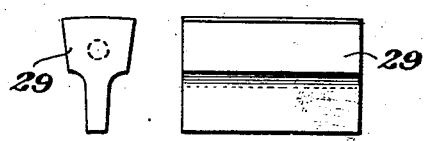
Fig. 23.
Fig. 9. Fig. 10.
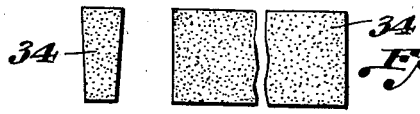
Fig. 13. Fig. 14.
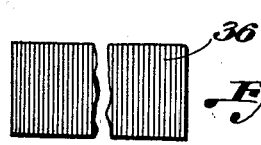
Fig. 15.
Fig. 16.
Fig. 8.
Inventors
FREDERICK WOLF
FRANTISEK SIGMUND
By Young, Emery & Thompson
attys.

March 7, 1944.  F. WOLF ET AL  2,343,354
ELECTRIC MOTOR
Filed Oct. 22, 1941  6 Sheets-Sheet 6

Inventors
FREDERICK WOLF
FRANTISEK SIGMUND
By Young, Emery & Thompson
attys.

Patented Mar. 7, 1944

2,343,354

UNITED STATES PATENT OFFICE 2,343,354

ELECTRIC MOTOR

Frederick Wolf, Cleveland, Ohio, and Frantisek Sigmund, New York, N. Y., assignors to The Lake Erie Chemical Company, a corporation of Ohio Application October 22, 1941, Serial No. 416,066

7 Claims. (Cl. 172—36)

This invention relates to electric motors, generators, transformers and similar machines provided with windings and more particularly has reference to the stator or core construction of such machines. The concept of the present invention is particularly useful in the submersible type of motor.

There are many known methods of water or liquid tightening of the stator winding for the construction of special motors which can operate under water or in liquids. The various types of winding have reached quite an important stage of development and are successfully used, especially industrially in the submersible pump motors in coal mines and oil wells, etc.

It has not been possible to develop the submersible motor for general use, especially in the fractional horsepower motors, because the construction and the methods of production are very expensive, due to the complicated construction, control, and the amount of manual labor required for the delicate work.

The known constructions employed are satisfactory when the motors are used for deep oil wells or for other rather specific or industrial uses. In that case the costly construction or labor is not the most significant factor. Different constructions are used to meet those requirements: Low voltage motors, motors with compressors pumping air around the motor, or with the stator submerged in oil, etc.

The previously described and commercially-used motors employed different methods to protect the normal stator winding, which method is not satisfactory because of the difficulties encountered with the labor required to construct the commonly-employed stator winding. And so, the winding or tightening of the stator winding in the known constructions which have been developed up to this time, has always been a difficult problem, and especially delicate when the motors employed were long in length or the winding had to be operated in the closed slots or in slots relatively narrow for the motors, which were limited in diameter for the relatively small bored openings or very narrow wells. The winding was not only expensive and a delicate process but could not be applied mechanically.

In all the known constructions no particular attention was paid to radical changes in the stator construction. All constructions were developed in one way only: to use the standard stator construction and prevent by various means the entry of the liquids or other irritants into the stator. Only the slightest changes were made in the shape and arrangement of the winding receiving slots.

An object of this invention is to provide a stator for motors having winding receiving slots into which the windings may be easily inserted.

Another object of this invention is to provide a stator having a rotor receiving bore extending therethrough, an arcuate winding receiving slot extending concentrically around said bore and dividing the stator into inner and outer portions, and an opening in the outer portion to provide access to said slot.

A further object of this invention is to provide a stator having a rotor receiving bore extending therethrough, an arcuate winding receiving slot extending concentrically around said bore and dividing the stator into inner and outer portions, and bridge means connectig the inner and outer portions and dividing the arcuate slot into segments.

Still another object of this invention is to provide a stator having a rotor receiving bore extending therethrough, an arcuate winding receiving slot extending concentrically around said bore and dividing the stator into inner and outer portions, bridge means connecting the inner and outer portions and dividing the arcuate slot into segments, openings in the outer portion affording access to the segments, and closures for the openings.

A still further object of this invention is to provide a stator having a rotor receiving bore extending therethrough, an arcuate winding receiving slot extending concentrically around said bore and dividing the stator into inner and outer portions, bridge means connecting the inner and outer portions and dividing the arcuate slot into segments, openings in the outer portion affording access to the segments, and closures for the openings, said closures having bridge-like elements for further subdividing said arcuate slot.

Yet another object of this invention is to provide wedges or closures for slots or openings in stators or cores of magnetic electric machines which wedges or closures are formed of particles or powder of magnetic material either per se or admixed with plastics or other non-magnetic materials.

Another object of this invention is to provide a method of forming and assembling stators.

With these and other objects in view which will more fully appear hereinafter, the invention resides in the steps, parts and combinations described.

In the drawings:

Fig. 8 is a cross sectional view of a winding to be inserted in the stator slot.

Figs. 9 and 10 are end and side views respectively of a wedge or closure according to the present invention.

Fig. 11 is an end view of a modified form of wedge.

Fig. 12 is a side view of Fig. 11.

Fig. 13 is an end view of a further modified form of wedge.

Fig. 14 is a side view of Fig. 13.

Fig. 15 is a view like Fig. 14 showing still another modified form of wedge.

Fig. 16 is another view like Fig. 14 showing a still further modified form of wedge.

Fig. 23 is a view similar to Fig. 21 showing how the winding of Fig. 22 is assembled.

Figure 1:
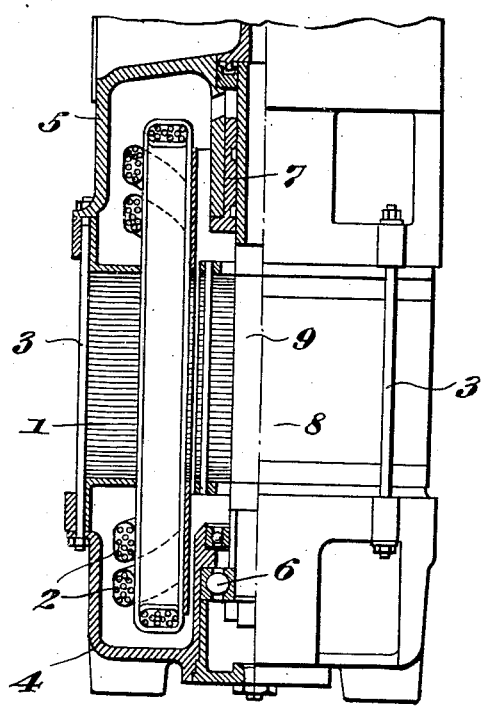
Fig. 1 is a fragmentary view of a motor constructed in accordance with the present invention shown partly in vertical section.

A motor constructed in accordance with the present invention is shown in Fig. 1 and comprises a stator 1 having windings 2 positioned in slots in the stator.

The stator is of laminated construction and the laminae or plates are secured together by bolts 3, welding or other suitable means.

End caps or casings 4 and 5 are also secured in place by the bolts 3, and carry bearings 6 and 7 for the shaft 8 of rotor 9 which may be of usual construction.

Figure 3:
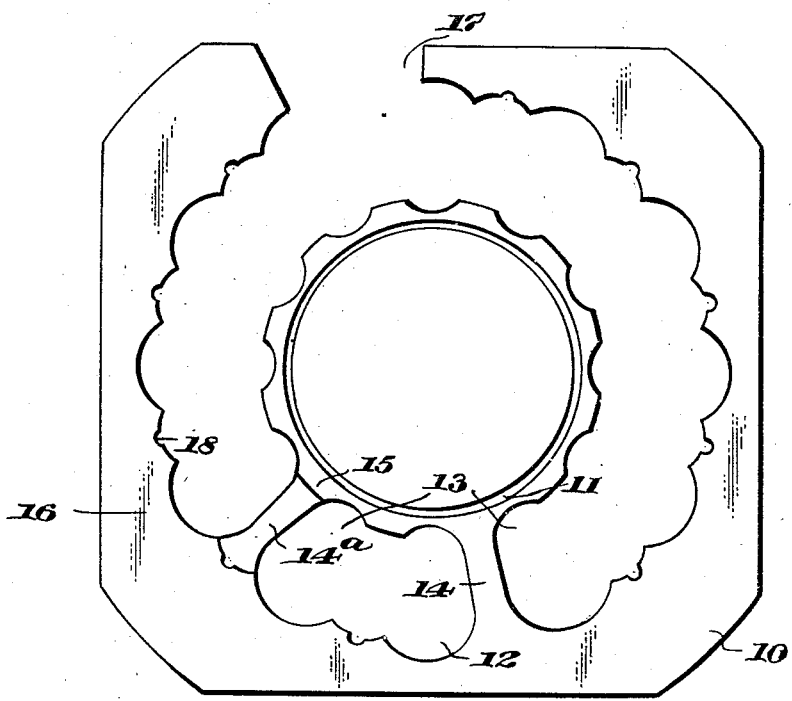
Fig. 3 is a plan view of one of the plates or laminations forming the stator.

The purpose of the present invention is to provide a construction which simplifies the insertion of windings in slots in the stator. One form of construction of the plates or laminae of the stator which enables ease of assembly of the windings is shown in Fig. 3. This plate 10 is stamped or otherwise shaped to provide a central aperture or bore 11 which is of a diameter chosen to provide a suitable air gap between the periphery of the same and the outer circumference of the rotor to be inserted therein.

Between the bore 11 and the outer edge of plate 10 there is formed an arcuate slot 12 concentric with the bore 11. This slot may be formed by punching out the winding receiving openings 13 and then removing a number of the bridges 14 of material between the openings 13. Such an operation divides the plate 10 into an inner annular portion 15 and an outer portion 16 connected by the remaining bridge or bridges 14. As shown in Fig. 3 only one bridge 14 is left integrally joining the inner and outer portions of the plate 10.

Figure 5:
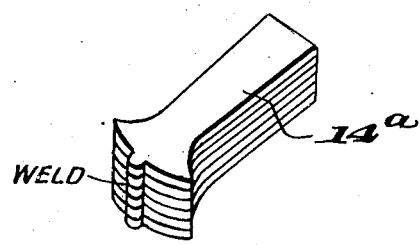
Fig. 5 is a detail view illustrating how the plates are joined.

It is convenient to form an opening 17 diametrically opposite the single bridge 14, as illustrated. In a stator formed by laminating a number of plates 10 as illustrated in Fig. 3 with the bridges and openings 17 in register the windings may be introduced through the opening 17 and positioned in their proper places. After this procedure, bridges removed from plate 10 may be assembled in stacks and welded or otherwise joined together (see Fig. 5) to form laminated wedges or bridges, and are inserted between adjacent windings. Notches 18 are formed in the outer portion 16 and cooperating projections 19 are formed in the ends of the bridges 14 which serve to retain the bridges in proper position when assembled after placing the windings in their positions.

Figure 4:
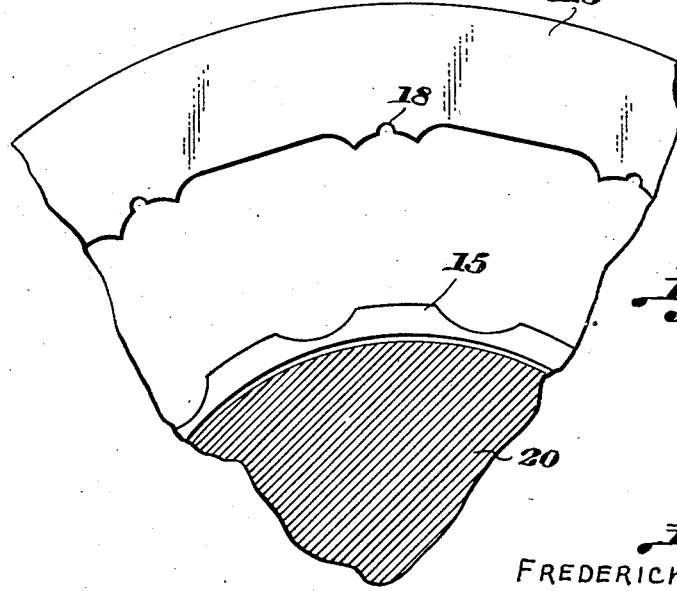
Fig. 4 is an enlarged fragmentary view of a plate similar to Fig. 3.

In assembling the plates of the stator they are mounted on a mandrel 20 as indicated in Fig. 4 to insure proper alignment of the bores 11 in the several plates so that the finished stator will have a bore of accurate dimensions therein to provide the proper clearance between the stator and rotor to give the desired air gap.

Figure 6:
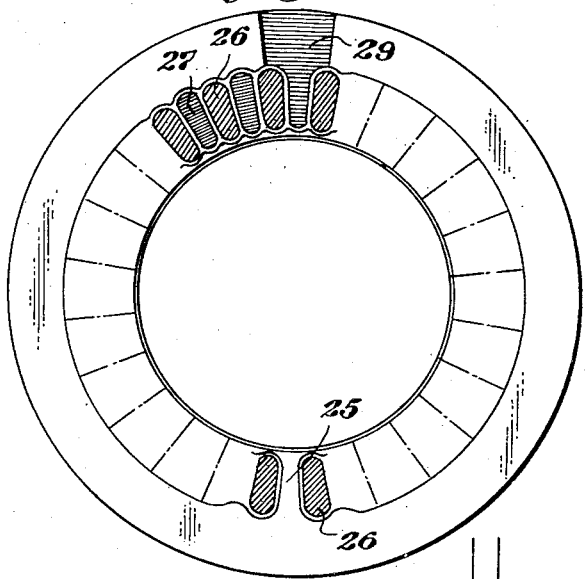
Fig. 6 is a horizontal sectional view of a motor constructed according to the present invention.
Figure 7:
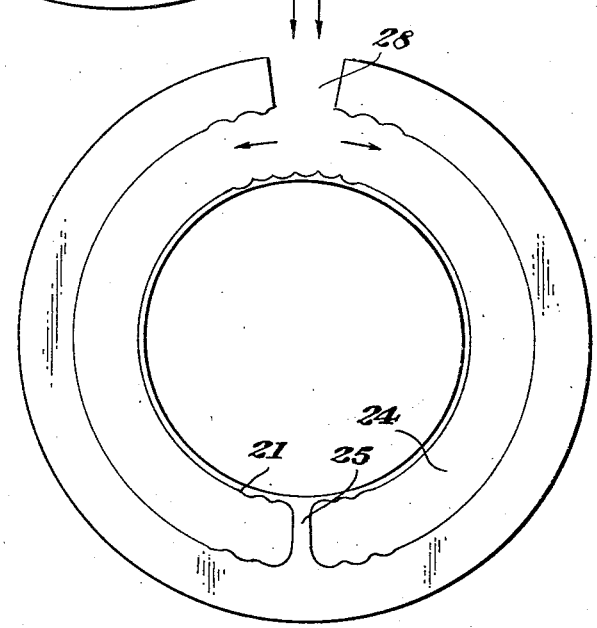
Fig. 7 is a plan view of one of the stator plates of the motor of Fig. 6.

In Fig. 6 a motor is shown, the stator of which is slightly different from that shown in the preceding figures. Stator plates 21 (Fig. 7) are stamped to form inner and outer portions 22 and 23 separated by an arcuate slot 24 and connected by bridge 25. The edges of the slot are serrated to receive the windings 26 and removable bridges 27 as shown in Fig. 6. This construction enables the windings 26 and bridges 27 to be accurately secured in position.

The opening 28 may be filled by a combined wedge and bridge 29 of magnetic material, as shown in Fig. 9.

A modified form of wedge and bridge 30 is shown in Figs. 11 and 12. In this form part 31 is formed of magnetic material and serves to complete the magnetic circuit between the inner and outer portions of the stator. Part 32 of the wedge-bridge is formed of plastic material which is useful to seal the part 31 in place. Wings 33 may be provided to fit into grooves in the walls of the opening 28 to retain the wedge in place.

In addition to the laminated bridge construction other forms of construction are contemplated. For instance as indicated in Figs. 13 and 14, the bridge may be formed of iron or other magnetic metal filings or powder. The finely divided metal may be agglomerated into the desired shape 34 by the usual methods employed in powder metallurgy or filled into the spaces in the arcuate slot between adjacent windings. The metal powder may be mixed with other materials including plastics and either injected into the spaces between the windings or cast or molded into desired shapes.

Instead of powder, larger particles 35 of magnetic material may be used as indicated in Fig. 16. These may be used alone or admixed with other materials including plastics. In the latter instance as mentioned hereinbefore, the plastic binds the particles together.

The bridges or wedges may of course be laminated as indicated in Fig. 15 wherein the plates 36 are welded, riveted or otherwise secured together.

Figure 17:
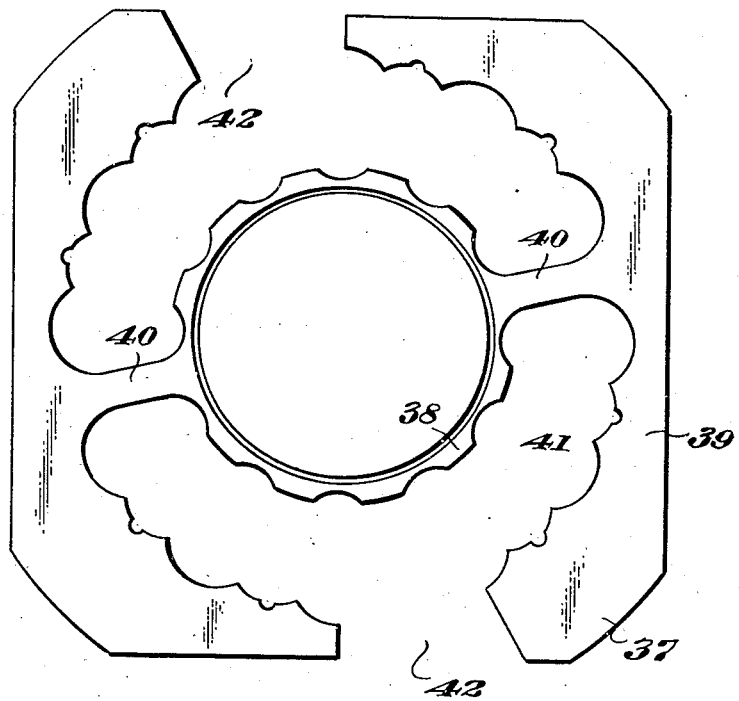
Fig. 17 is a plan view of a further form of stator plate.

As described, in stamping the stator plates, a single bridge is left to connect the inner and outer portions separated by the arcuate slot. It is within the scope of the present invention to leave more than one bridge. In Fig. 17 a plate 37 is shown in which the inner and outer portions 38 and 39 are connected by two bridges 40. This construction divides the arcuate slot 41 into two segments. The outer portion 39 is provided with two openings 42 providing access to the slot segments 41 and through which windings may be inserted into said slot segments.

A stator with plates as shown in Fig. 17 is constructed similarly to the stator hereinbefore described, the bridges and wedges shown in the preceding figures being used.

If desired, more than two bridges may be left connecting the inner and outer portions of the stator forming plates. In such constructions an opening is provided between two adjacent bridges to enable the insertion of the windings in the slots.

Figure 18:
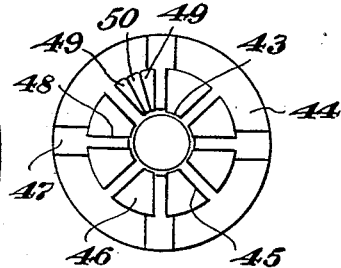
Fig. 18 is a plan view of a further form of stator plate.

Fig. 18 illustrates a construction in which the inner and outer portions 43 and 44 of the plates are connected by four integral bridges 45. Between adjacent bridges 45 the outer portions 44 are cut away to provide openings for access to the segments of slot 46. These openings are closed by closures 47 which have inwardly extending elements 48 serving as bridges to subdivide the segments of the slot 46 between adjacent bridges 45.

In placing the windings 49 in position, they are inserted through the openings later closed by closures 47 and between adjacent portions of the windings additional bridges 50 are positioned.

The elements 47—48 and 50 are constructed as described in connection with Figs. 9-16 and are placed in position after insertion of windings in the slot segments 46.

Figure 19:
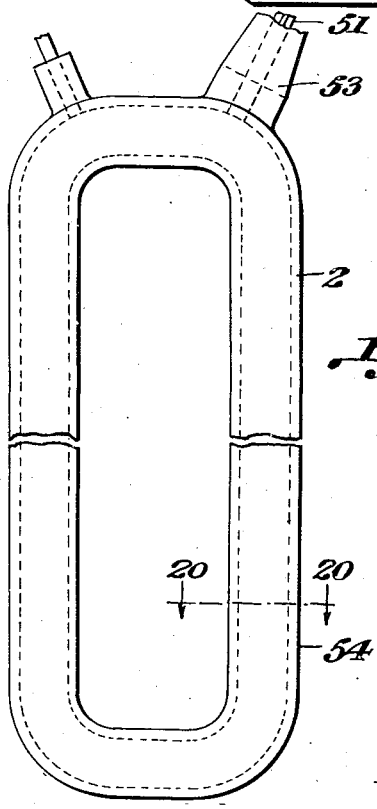
Fig. 19 is an elevational view of a skein or loop winding according to the present invention.

Another important aspect of the present invention is the construction of the windings. As shown in Fig. 19 the windings 2 are in the form of large skeins or loops. The wires 51 of the winding are grouped together in a manner similar to a cable and enclosed in an insulating sheath or casing 52. After the casing is assembled on the cable the entire coil may be coated with rubber latex or other flexible plastic which has good electrical and hydraulic insulating properties and good mechanical resistance. The coating 54 may be applied by wrapping uncured rubber tape about the cable-like winding. The ends of the wire forming the winding extend out of the insulating casing at the outlet 53.

After wrapping or coating the winding with the unvulcanized tape or latex the same is cured to form an impervious protective coating. By completely forming the winding before inserting it in the stator slots, said winding may be thoroughly tested electrically, hydraulically and mechanically and if any defects are found, the winding can be rejected. This eliminates the losses in labor and material which occur when a winding is tested only after assembly on the stator which is the usual procedure.

Figure 21:
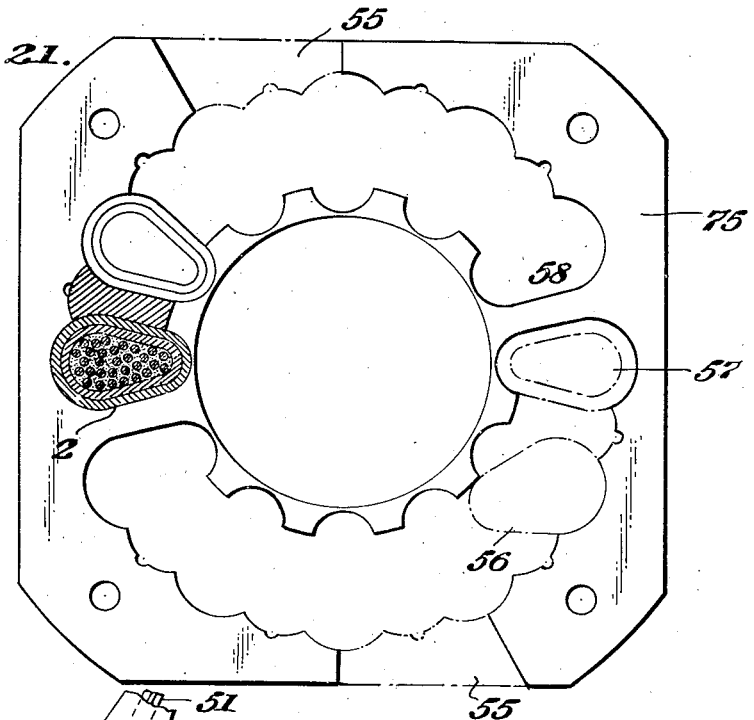
Fig. 21 is a plan view of a stator showing how windings are inserted.
Figure 20:
Fig. 20 is a sectional view taken on line 20—20 of Fig. 19.

A winding such as shown in Figs. 19 and 20 may be inserted in a stator 75 as illustrated in Fig. 21, that is, by introducing the winding through the openings closed by closures 55 and then moving the portion of the winding sideways as indicated by winding portion 56 through the arcuate slot to its position as indicated at 57 against bridge 58. Immediately following this operation a bridge is introduced which holds the winding portion 57 in place. Then another portion of the winding can be inserted and so on until the entire winding has been inserted.

Figure 2:
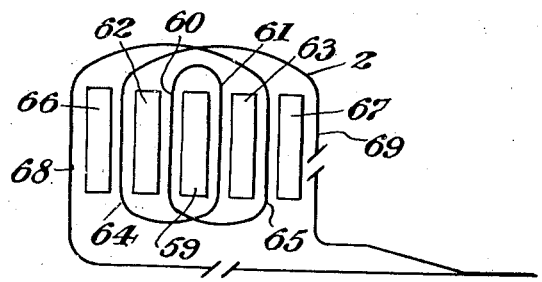
Fig. 2 is a schematic view of the stator winding of the motor.

A schematic arrangement of the winding is indicated in Fig. 2. In this figure portions 60 and 61 of the loop winding are looped about a bridge 59. Removable bridges 62 and 63 are then inserted and the portions 64 and 65 of the winding are then looped about bridges 62 and 63. Following this operation further bridges 66 and 67 are inserted and the winding portions 68 and 69 looped about the latter bridges. Fig. 2 clearly shows the direction of the windings which are such as to obtain the proper magnetic effects.

In the case of a two pole motor, two coils or loops may be used for the stator and only two leads need be connected to the other electrical elements of the motor.

On a split phase motor in which it is necessary to use starting and running windings, these windings are formed as described above and placed in position in the arcuate slots as described above.

Figure 22:
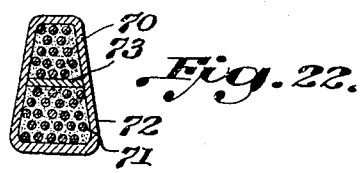
Fig. 22 is a view similar to Fig. 20 of a modified form of winding.

The windings may be formed of a plurality of separate loops to facilitate assembly. In such cases a plurality of portions of separate loops may be inserted between adjacent bridges. Also separate windings may be enclosed in the same protective casing as indicated in Fig. 22. As shown, two separate windings 70 and 71 are encased in a casing 72 divided by a partition 73 into two compartments.

The winding shown in Fig. 22 is assembled in a stator 74 as indicated in Fig. 23 in a manner identical to that described in connection with Fig. 21.

In Figs. 22 and 23 the windings are of different cross section from those shown in Figs. 20 and 21 but any desired or convenient cross section may be used.

While the winding of Fig. 19 is very advantageous when used with the stator construction described, it may also be used with other types of stators in which the ordinary slot construction is employed.

From the foregoing, it will be appreciated that we have devised motor stator constructions which differ from any heretofore developed and which enable the expeditious assembly of mechanically produced windings.

Having described our invention, we claim:

1. A stator for electric motors comprising a stack of magnetic metal plates having a central rotor receiving bore extending therethrough and an arcuate winding receiving slot extending concentrically around said bore and dividing said stator into inner and outer portions, said outer portion having an opening extending radially out from said slot to afford access to the arcuate slot, said opening being of a width to accommodate the movement of a winding therethrough into said slot and joining a segment of said slot to radiate therefrom, a plurality of windings in said arcuate slot, and a plurality of magnetic elements positioned in said slot between adjacent windings and bridging the inner and outer portions of said stator.

2. A stator for electric motors comprising a stack of magnetically susceptible metal plates having a central rotor receiving bore extending therethrough and an arcuate winding receiving slot extending concentrically around said bore and dividing said stator into inner and outer portions, a bridge integrally connecting the inner and outer portions, said outer portion having an opening to afford access to the arcuate slot, said opening being opposite from said bridge and permitting windings to be moved through the opening into said slot and around through said slot into positions on opposite sides of said bridge.

3. A stator for electric motors comprising an inner tubular member of magnetic susceptible laminated material having a bore for reception of a rotor, an outer member surrounding the inner tubular member in spaced relation thereto, a bridge integrally connecting said inner and outer members, the space between said members being in the form of an arcuate winding receiving slot concentric with the bore in said inner member, said outer member having an opening providing access to said arcuate slot, a plurality of windings in said arcuate slot, a plurality of removable bridges of magnetic susceptible material in said arcuate slot between adjacent windings and bridging said inner and outer members, and a magnetically susceptible plastic closure member for the opening in said outer member.

4. A stator for electric motors comprising an inner tubular member of magnetic susceptible material having a bore for reception of a rotor, an outer member surrounding the inner tubular member in spaced relation thereto, a bridge integrally connecting said inner and outer members, the space between said members being in the form of an arcuate winding receiving slot concentric with the bore in said inner member, said outer member having an opening providing access to said arcuate slot, a plurality of windings in said arcuate slot, a plurality of removable bridges of magnetic susceptible material in said arcuate slot between adjacent windings and bridging said inner and outer members, one of said removable bridges lying adjacent said opening, and a plastic wedge-like member cooperating with said last-recited bridge to hold the bridge in place, said wedge-like member extending from, and being carried by, said last-recited bridge for closing said opening.

5. A stator for electric motors comprising an inner tubular member having a rotor receiving bore, a plurality of spoke-like ribs extending radially outwardly from the external surface of said member, a tubular casing carried by the outer ends of said ribs concentric with and spaced from the inner member to provide arcuate winding receiving slots between the ribs, said outer member having a plurality of axially extending openings between adjacent ribs to afford access to said slots, segmental closure elements for said openings for completing the tubular casing, and ribs extending inwardly from the closure elements and abutting the inner tubular member to subdivide the winding slots between adjacent ribs carried by the inner member.

6. A stator for electric motors comprising an inner tubular member having a rotor receiving bore, an outer member concentrically surrounding the inner member in spaced relation thereto, a plurality of removable bridging elements between the inner and outer members and dividing the space therebetween into winding receiving compartments, the outer member having an axially extending opening between two adjacent bridging elements providing access to the winding receiving compartment between said adjacent bridging elements, a closure for said opening, and a bridging element carried by said closure and extending inwardly between said adjacent bridging elements to subdivide the space therebetween.

7. A stator for electric motors comprising a stack of magnetic metal plates having a central rotor receiving bore extending therethrough, and an arcuate winding receiving slot extending concentrically around said bore and dividing said stator into inner and outer portions, a plurality of windings in said arcuate slot, said outer portion having an opening extending radially out from said slot, said opening having a relatively narrow width constituting a fraction of the circumferential extent of said slot to provide a throat to said slot to afford access to the arcuate slot whereby said windings may be positioned in the said slot through the said opening, and a plurality of magnetic elements positioned in said slot between adjacent windings and bridging the inner and outer portions of said stator, said bridging magnetic elements comprising particles of magnetic material.

FREDERICK WOLF.
FRANTISEK SIGMUND.